US006240798B1

United States Patent
Erikson et al.

(10) Patent No.: US 6,240,798 B1
(45) Date of Patent: Jun. 5, 2001

(54) REINFORCED ANTI-BACKLASH NUT WITH GRADUATED THREAD DEPTH FINGERS

(75) Inventors: Kenneth W. Erikson, Amherst; Keith W. Erikson, Hollis, both of NH (US)

(73) Assignee: Kerk Motion Products, Inc., Hollis, NH (US)

( * ) Notice: Subject to any disclaimer, the term of this patent is extended or adjusted under 35 U.S.C. 154(b) by 0 days.

(21) Appl. No.: 09/345,942

(22) Filed: Jul. 1, 1999

(51) Int. Cl.[7] .................................... F16H 1/18
(52) U.S. Cl. .................. 74/424.8 R; 74/89.15; 74/441
(58) Field of Search ............ 74/424.8 R, 89.15, 74/441

(56) References Cited

U.S. PATENT DOCUMENTS

| Re. 32,433 | 6/1987 | Erikson et al. | 74/441 |
|---|---|---|---|
| 4,131,031 | 12/1978 | Erikson et al. | 74/441 |
| 4,353,264 | 10/1982 | Erikson et al. | 74/441 |
| 4,566,345 | 1/1986 | Erikson et al. | 74/89.15 |
| 5,027,671 | 7/1991 | Erikson et al. | 74/441 |
| 5,913,940 | 6/1999 | Erikson et al. | 74/441 |
| 5,937,702 | 8/1999 | Erikson et al. | 74/459 |

*Primary Examiner*—Lenard A. Footland
(74) *Attorney, Agent, or Firm*—Hamilton, Brook, Smith & Reynolds, P.C.

(57) ABSTRACT

An anti-backlash nut has flexure members which are continuously biased inwardly against a lead screw by a force-applying sleeve which acts on ramps on the flexure member. The spline means include means on the longitudinal flexure members and the force applying sleeve to impart rigidity to the longitudinal flexure members in a direction tangential to the longitudinal direction of movement of the nut.

11 Claims, 4 Drawing Sheets

REINFORCED ANTI-BACKLASH NUT WITH GRADUATED THREAD DEPTH FINGERS

BACKGROUND OF THE INVENTION

In many applications, it is important to drive an element of a machine along a lead screw with accurate positional repeatability and constant drag torque in both forward and reverse directions. Data printers and x-y tables, used as peripheral equipment in the computer industry, for example, have such requirements.

Positioning devices designed to meet these requirements have been proposed, and many of these employ an anti-backlash nut to achieve the positional accuracy along the screw which is required. Examples of two such anti-backlash nut assemblies which have been proposed are described in the patent literature as follows.

In U.S. Pat. No. 3,656,358, issued to Kopp, a linear positioning device is disclosed which is stated to have an improved collar for use with a comparatively inexpensive rod having multiple grooves. The collar is telescoped over and adapted to be translated back and forth relative to the elongated rod. This collar includes cantilevered fingers which are resiliently wedged into angularly spaced grooves formed in the rod to preload the collar onto the rod and prevent rotational play from developing between the two. In a specific embodiment, the collar is telescoped onto a rod in the form of a splined shaft while in another embodiment, the collar is a nut threaded onto a screw with multiple threads.

In U.S. Pat. No. 3,997,269, issued to Linley, an anti-backlash, self-aligning nut construction with specially constructed tubular nut bodies which co-act with concentric spring sleeves is described. The nut bodies, in general, each have a pair of spring-biased elements provided with internal thread formations adapted for engagement with the external threads of a screw. In one embodiment, a self-aligning spring sleeve is provided having solely three pairs of oppositely-disposed transverse slots to obtain the desired aligning features. The nut body has a base portion which is separated from the spring-biased elements by means of two transverse slots which, together with an adjacent pair of slots in the spring sleeve, form in effect a universal joint. One of the remaining slot pairs in the sleeve is oriented circumferentially with respect to the first pair by an angle of 90°, with a third pair of slots being circumferentially aligned with the first pair.

More recently, an anti-backlash nut having oppositely-directed longitudinal flexure members has been disclosed in U.S. Pat. No. 4,210,033, which issued to the present inventors. This anti-backlash nut has a continuous portion extending longitudinally from one end of the screw to the other. In addition, there are at least two, and usually more, oppositely-directed longitudinal flexure members which have one end fixed to the anti-backlash nut and one end free-floating. The oppositely-directed longitudinal flexure members are biased towards the screw by one or more radial springs or other means for biasing.

One style of anti-backlash nut has one or more longitudinal flexure members with one end of each member fixed and one end free floating in cantilever fashion. The nut, including the flexure members, undergoes translational movement along a threaded shaft or lead screw. Each longitudinal flexure member has a ramp at its free-floating end. The nut is surrounded by an annular pressure applying ring which derives its force from a compression spring. The ring is constantly urged against the ramps which, in turn, creates radial force vectors to maintain the internal threads formed on the flexure members in contact with the threads of the shaft during operation and even after the nut has become worn. Such an anti-backlash nut is disclosed in our U.S. Pat. No. 4,249,426 which reissued as RE. 32,433.

The threads on the shaft are in the form of a helix, as are the mating threads on the interior of the flexure members in the anti-backlash nut described in U.S. Pat. No. 4,249,426. When a load is placed on the nut, as for example, when it is attached to a carriage or printer, there is a substantial force component acting axially on the shaft or lead screw and bearing on the threads of the flexure members. The axial force translates into two force vectors, one in the axial direction of the shaft and the other normal thereto, tangential to the shaft. This induces the cantilever mounted longitudinal flexure to deflect in a direction normal or tangential to the axis of the shaft. This can induce unwanted backlash.

U.S. Pat. No. 5,027,671 discloses an anti-backlash nut with an annular member to counteract the unwanted backlash To add structural rigidity to the flexure members and to counteract force acting in a direction which is tangential to the longitudinal direction of movement of the nut, cooperating spline are provided on the longitudinal flexure members and on the annular member. The annular member surrounds the nut body to apply an external force radially inwardly to each of the ramps.

The spline includes a longitudinal groove in each of the flexure members extending parallel to the axis of the screw and a complementary mating longitudinal ridge projecting from the annular member engageable within the groove.

Whenever a load is placed on the nut, thread flanks tend to wear. Since the flanks are angularly disposed to the axis of rotation of the screw, upon wear the threads on the fingers drop more deeply into the threads of the screw and vice versa, until crests abut roots and flanks separate. The wear of the flanks thus contributes to axial play. To operate correctly and assure no backlash, both flanks of a thread must engage the flanks of adjacent threads on the mating part.

It is, therefore, an object of the present invention to provide an anti-backlash nut having longitudinal flexure members in which the flexure members are tailored to minimize radial play and achieve a radial and axial stiffness even as surfaces wear.

SUMMARY OF THE INVENTION

The invention resides in an anti-backlash nut which moves along a lead screw in either of two longitudinal directions. The screw has an external helical thread and the nut has internal mating threads. The nut includes at least one longitudinal flexure member which has one end fixed to the nut body with the other end free-floating; typically at least two and preferably three flexure members are included. The longitudinal flexure members have inclined ramps on their outer surfaces. The ramps extend radially outward in a direction away from the fixed end.

An annular member surrounding the nut body applies an external force radially inward to each of the ramps, the force being substantially constant in either direction of movement of the nut. The annular member is urged by a compression spring into engagement with the ramps. The axial force applied to the ramp urges the internal threads of the flexure members constantly into engagement with the external threads of the shaft to eliminate backlash.

The interior threads of the anti-backlash nut are tapped out with increasing depth towards the free-floating end of the longitudinal flexure members.

In a preferred embodiment, the mating, longitudinally-extending spline mechanism on the longitudinal flexure members and the annular force-applying member to impart rigidity to the longitudinal flexure members in a direction tangential to the longitudinal direction of the movement of the nut.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
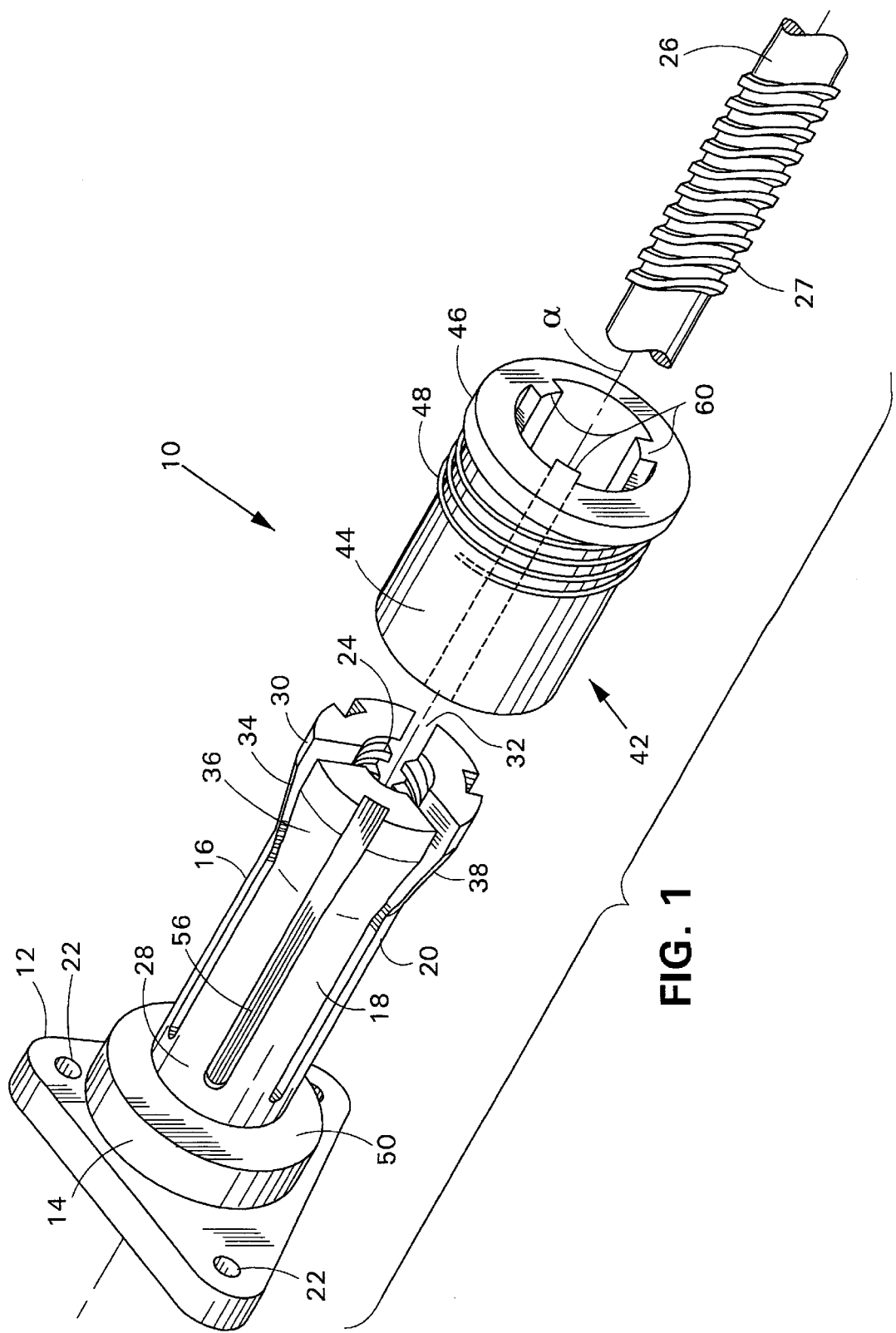
FIG. 1 is a perspective view of an anti-backlash nut according to the invention.
Figure 2:
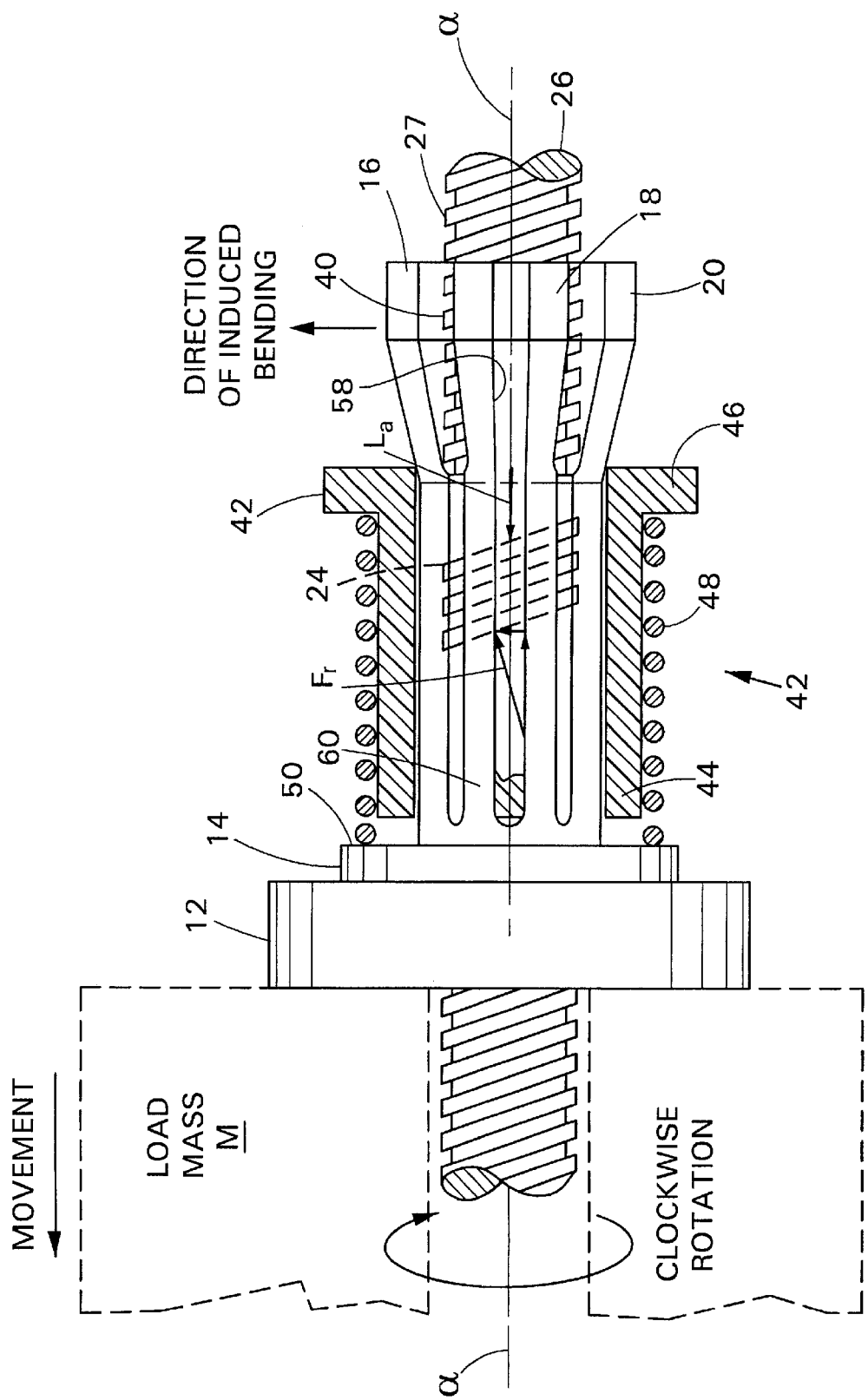
FIG. 2 is a side elevation of the anti-backlash mechanism shown under load.

Referring to FIGS. 1 and 2, an anti-backlash nut is generally designated 10, and has a face plate 12, a cylindrical projection 14 and a plurality of flexure members 16, 18 and 20. The face plate 12 is substantially triangular in shape, although it may be any convenient shape as determined by the load to which it is to be attached. The face plate 12 includes a plurality of holes 22 for securing the anti-backlash nut 10. The anti-backlash nut 10 has a threaded bore 24, as explained below in greater detail, to receive a lead screw 26.

The flexure members 16, 18, and 20 extend from a circumferentially continuous portion 28 to a segmented circumferential portion 30. The three longitudinal flexure members 16, 18, and 20 are separated from each other by gaps 32 extending outwardly from the circumferentially continuous portion 28.

The segmented circumferential portion 30 at the free end of the nut is made up of three segments, one at the end of each of the longitudinal flexure members 16, 18 and 20 which, respectively, have ramps 34, 36 and 38, near the outside surfaces of their free floating ends. The circumferential diameter of the segmented portion 30 is greater than that of the continuous portion 28.

The anti-backlash nut 10 has a force-applying sleeve 42. The force-applying sleeve 42 is hollow and has a cylindrical portion 44 and a collar 46. A compression spring 48 surrounds the cylindrical portion 44 and abuts the collar 46 when the sleeve 42 is assembled over the flexure members 16, 18, and 20. The opposite end of the spring abuts a face 50 on the projection 14 or the face plate 12, depending on the diameter of the spring. Under the force of the compression spring 48, the face of the collar of the sleeve 42 is urged continuously against the ramps 34, 36, and 38 to cause the flexure members 16, 18, and 20 to be constantly urged inwardly toward the axis alpha to compensate for wear and to reduce backlash between the threads 24 of the anti-backlash nut 10 and the threads 27 of the lead screw 26.

The anti-backlash nut 10 is hollow and inwardly threaded, as indicated at 24 in FIGS. 1 and 2. Its threads 24 are in engagement with the threads 27 on the lead screw 26. Rotation of the lead screw in either a clockwise or counter-clockwise direction causes the anti-backlash nut to translate without rotation lengthwise of the anti-backlash nut 10 and when the face plate 12 of the anti-backlash nut 10 is attached to a load, it causes the load to reciprocate relative to the axis alpha ($\alpha$) of the screw.

The force applying sleeve 42, also referred to as a spline mechanism, comprises, in part, longitudinal grooves 56 formed in the surface 58 of each of the longitudinal flexure members 16, 18 and 20 and extending parallel to the axis alpha. When the sleeve 42 is fitted over the flexure members 16, 18 and 20, mating, parallel projecting ridges 60 shown broken away in portion in FIG. 2, formed on the inside of the sleeve 42 are received and slide in the longitudinal grooves 56 which are located at the same angular spacing relative to the axis alpha ($\alpha$), as are the ridges 60. The individual flexure members 16, 18 and 20 extend parallel to the rotational axis alpha of the lead screw 26, which is also the central axis of the anti-backlash nut 10.

Figure 3:
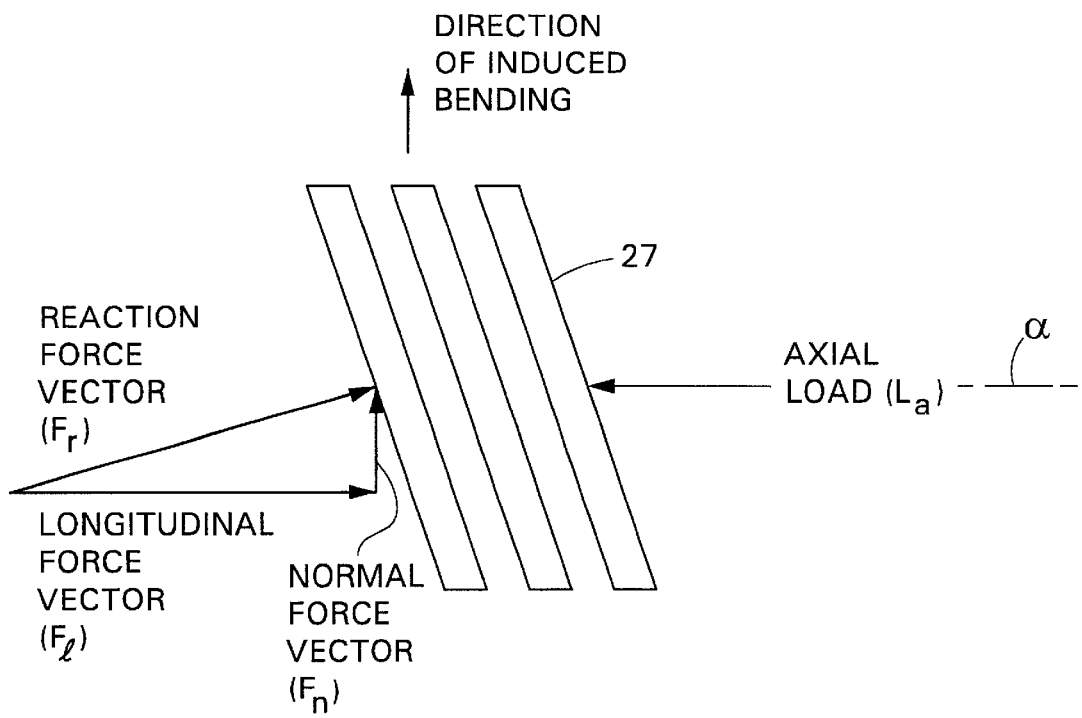
FIG. 3 is a force diagram of the mechanism under load.

Referring particularly to FIGS. 2 and 3, when, for example, the lead screw 26 is rotating in a clockwise direction with a load mass M secured to the face plate 12, the anti-backlash nut 10 and the mass M are moved from right to left, as viewed in the figures. An axial load $L_a$ is delivered to the nut by the threads 27 of the lead screw 26. Since the threads are helical about the axis alpha, they are inclined at an angle to the axial load $L_a$.

In FIG. 3, the reactive forces to the load will be seen acting on the interior threads 24 of the longitudinal flexure members 16, 18, and 20 of the anti-backlash nut 10. There is a reaction force vector $F_r$ acting normal to the threads 24 on the flexure members and longitudinal force vector $F_1$ parallel to the axis alpha and a normal force vector $F_n$ acting at right angles to the axial load. The normal force vector $F_n$ causes the flexure members 16, 18, and 20 to be bent or induced away from the parallelism with the axis alpha in the direction of the arrow designated "direction of induced bending". This force is inclined to separate the threads 24 of the anti-backlash nut 10 on the inner side of the flexure members 16, 18 and 20 from the threads 27 on the lead screw 26, with a potential result of induced backlash. Thus, there is a component of force acting on the flexure members in a direction tangential or normal to the rotational axis alpha of the lead screw. This would cause the anti-backlash nut, generally made of plastic, to wear more rapidly than desired if not rectified.

Referring to FIGS. 2 and 3, thus, as the axial load $L_a$ is applied, the resultant normal force vector $F_n$, which induces bending of the flexure members 16, 18 and 20 in a direction tangential to the axis alpha, is counter-acted by the ridges 60 on the sleeve 42 preventing the flexure members from being displaced. The sleeve 42 surrounding this flexure member resists displacement due to its rigidity and its resistance to tangential compression. This not only increases wear life of the product, but prevents inadvertent backlash from being created.

Figure 4:
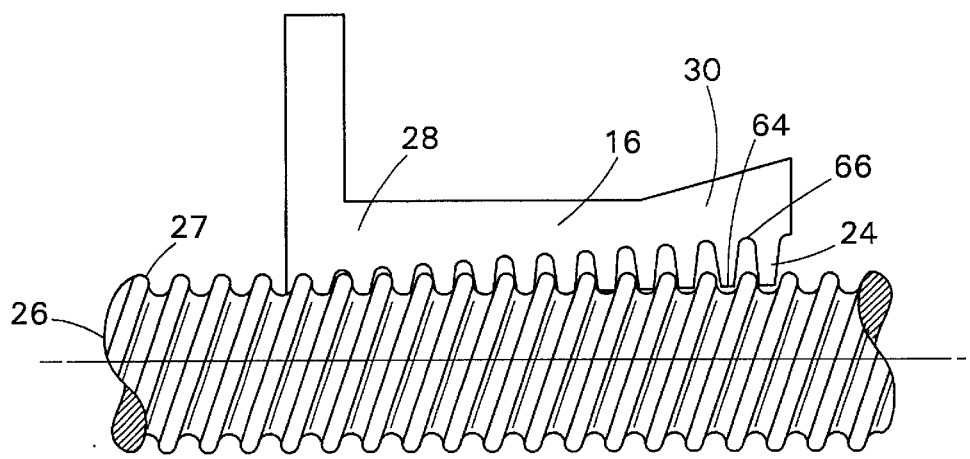
FIG. 4 is an enlarged view of one of the longitudinal flexure members.

Referring to FIG. 4, one of the flexure members 16, 18 or 20 is shown. The threads 24 of the flexure member 16 have a varying depth. A thread has a depth that is measured from the tip 64 to the root 66 of the thread. The root of the thread is deeper as you move from the circumferentially continuous portion 28 to the segmented circumferential portion 30. The threads nearest the cantilevered end of the nut fingers contribute more to radial stability, where the nut is less compliant and wear is less. The threads near the free ends of the fingers afford more axial stability. More flank wear occurs closer to the free ends of the fingers since it is this end of the nut fingers where radial pressure is applied through the conical ramps being pressed toward the axis of the screw. Maintaining flank-to-flank engagement by increasing depth of the roots is more important at the free end. Thus, the threads are "tapped out" with increasing depth toward the free end to gain the best compromise solution.

By varying the depth the whole screw cannot start to slide up in the flanks of the anti-back lash nut 10 since the root is not deeper on the fixed end. At the free end, the force-applying sleeve 42 keeps the tip of the threads of the flexure member in contact. The fixed end provides the radial stiffness; the free end provides the axial stiffness. As you progress out the thread, the clamping pressure of the ring is not as great as an inherent rigidity or stiffness of the anchored ends.

Figure 5:
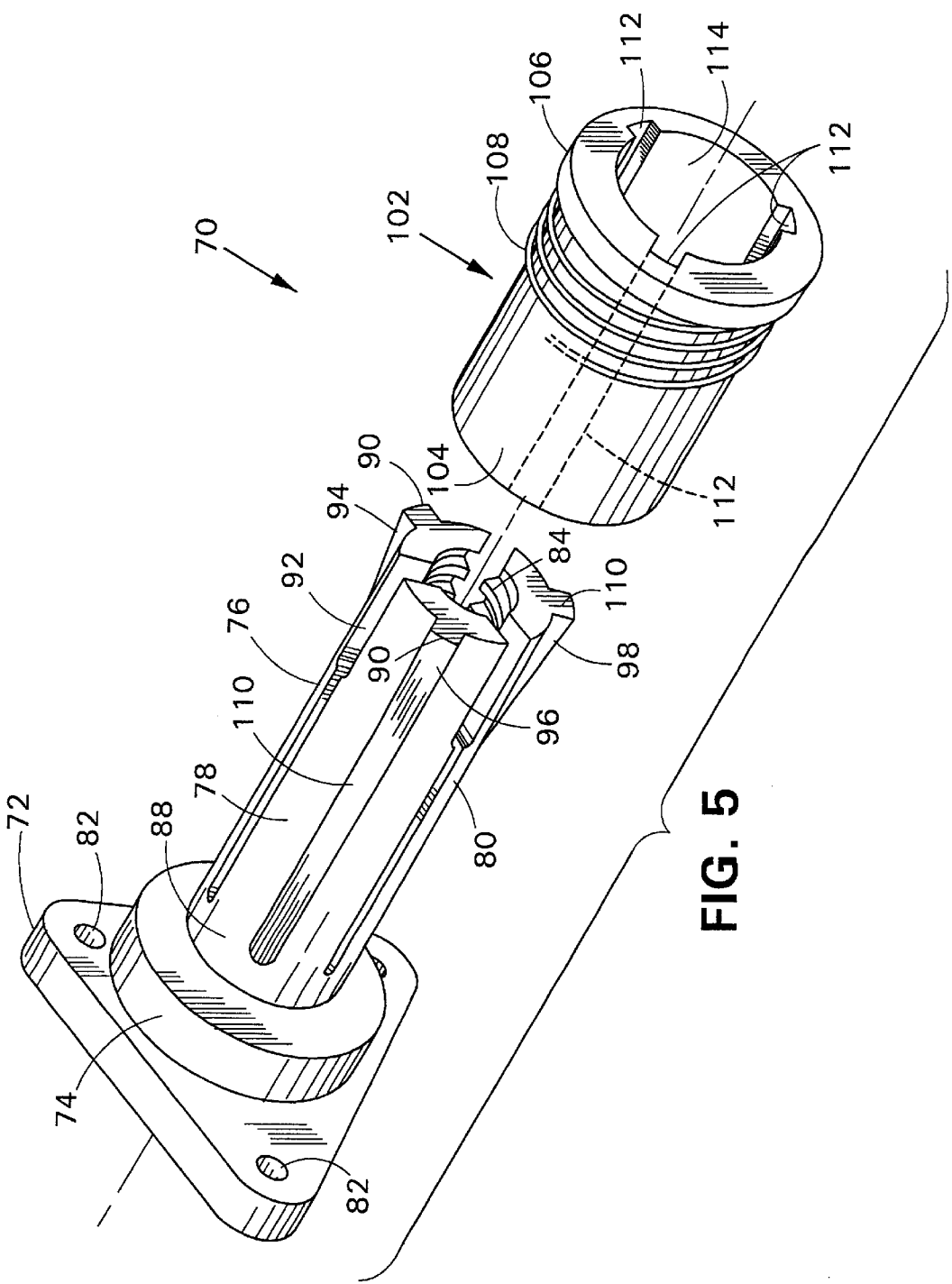
FIG. 5 is a perspective view of a second embodiment of the present invention.

Another embodiment of the invention is seen in FIG. 5; in this embodiment, the anti-backlash nut 70 has a face plate 72, a cylindrical projection 74 and a plurality of flexure members 76, 78 and 80. The face plate 72 includes a plurality of holes 82 for securing the anti-backlash nut 70. The flexure members 76, 78, and 80 extend from a circumferentially continuous portion 88 to a segmented circumferential portion 90. The three longitudinal flexure members 76, 78, and 80 are separated from each other by gaps 92 extending outwardly from the circumferentially continuous portion 88. Each of the longitudinal flexure members 76, 78 and 80, respectively, has ramps 94, 96 and 98, near the outside surfaces of their free floating ends.

The anti-backlash nut 70 has a force-applying sleeve 102. The force applying sleeve 102 is hollow and has a cylindrical portion 104 and a collar 106. A compression spring 108 surrounds the cylindrical portion 104 and abuts the collar 106. Under the force of the compression spring 108, the face of the collar of the sleeve 102 is urged continuously against the ramps 94, 96, and 98 to cause the flexure members 76, 78, and 80 to be constantly urged inwardly toward the axis alpha to compensate for wear and to reduce backlash between the threads 84 of the anti-backlash nut 70 and the threads 87 of the lead screw 86.

The force-applying sleeve 102, also referred to as a spline mechanism, includes longitudinally extending parallel ridges 110 on each of the flexure members 76, 78, and 80. The parallel ridges 110 extend parallel to the axis alpha (α) and are located radially outwardly thereof. There is a complementary mating longitudinal groove 112 for each of the ridges 110 spaced around the axis alpha (α) uniformly and projecting inwardly from an interior circular surface 114 of the force applying sleeve 102. There are ramp portions 110 on the ridges which are the equivalent of the ramps 16, 18 and 20 of the previous embodiment. The ridges 110 engage within the grooves 112 when the sleeve 102 is assembled over the flexure members similar to the previous embodiment. The splined sleeve grooves and ridges prevent the flexure members, under the induced direction of bending, from deflecting out of parallelism with the axis alpha (α).

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An anti-backlash nut for moving along a threaded, rotatable screw in either of two longitudinal directions, the nut comprising:
   a nut body with at least one longitudinal flexure member having one end fixed to the nut body and one end free-floating;
   interior threads on the flexure members in engagement with the threaded screw;
   inclined ramps on the exterior of the free-floating ends of the longitudinal flexure members, the ramps extending radially outward in a direction away from the fixed end;
   the interior threads are tapped out with increasing depth towards the free-floating end; and
   an annular member surrounding the nut body, for applying an axial force to each of said ramps to continuously urge the threads on the flexure member into engagement with the threaded screw.

2. An anti-backlash nut according to claim 1, further comprising mating, longitudinally-extending spline mechanism on the longitudinal flexure members and the annular force-applying member to impart rigidity to the longitudinal flexure members in a direction tangential to the longitudinal direction of the movement of the nut.

3. An anti-backlash nut according to claim 2, wherein the spline mechanism includes a projecting longitudinal ridge on each flexure member and a complementary mating longitudinal groove in the annular force-applying member.

4. An anti-backlash nut according to claim 2, wherein the spline mechanism includes a longitudinal groove in each flexure member, a complementary mating longitudinal ridge projecting from the annular force-applying member.

5. An anti-backlash nut designed to undergo bidirectional translational movement along a rotatable screw having an external thread thereon in response to relative rotational movement between the anti-backlash nut and screw; the anti-backlash nut comprising:
   (a) a nut body with a plurality of longitudinal flexure members having one end fixed to the nut body and one end free floating, the longitudinal flexure members having inclined ramps on their outer surfaces, the ramps extending radially outward in a direction away from the fixed end, the nut having an internal thread complementary to the external thread on the screw and tapped out in varying depths;
   (b) means including an annular member surrounding the nut body for directly applying an axial force to the ramps on each of said flexure members which axial force is converted by the angle of the ramps to a radial force which urges the flexure members inward, whereby the internal threads of said flexure members are maintained in close contact with the external threads of said screw regardless of which direction the nut travels on the thread; normal rotation of the screw acting to induce unwanted flexure of the flexure members tangentially of the translational movement of the nut; and
   (c) means for counteracting the unwanted flexure comprising: mating, longitudinally extending spline mechanism on the longitudinal flexure members and the annular force-applying member to impart rigidity to the longitudinal flexure members in a direction tangential to the longitudinal direction of movement of the nut.

6. An anti-backlash nut according to claim 5, wherein the spline mechanism includes a projecting longitudinal ridge on each flexure member and a complementary mating longitudinal groove in the annular force-applying member.

7. An anti-backlash nut according to claim 5, wherein the spline mechanism includes a longitudinal groove in each flexure member a complementary mating longitudinal ridge projecting from the annular force-applying member.

8. An anti-backlash nut according to claim 5, wherein the interior threads are tapped out with increasing depth towards the free-floating end.

9. An anti-backlash nut for translation along a rotatable threaded shaft, comprising, in combination:

(a) one or more longitudinal flexure members having one end fixed to said nut and one end free floating, said longitudinal flexure members having an inclined ramp on their outer surfaces, said ramp extending radially outward in a direction away from the fixed end;

(b) an annular pressure member co-axial to said flexure members for applying an axial force to the ramp on each of said flexure members;

(c) spring means for urging the annular force applying member into engagement with the ramp;

(d) an internal structure comprising threads on said flexure members of increasing depth toward the free floating end complementary to and in engagement with the external threaded structure of said shaft;

(e) said ramp having at least one angle of inclination whereby the axial force applied to said ramp urges the internal thread structure of the flexure members into engagement with the external thread structure of said shaft; normal rotation of the screw acting to induce unwanted flexure of the flexure members tangentially of the translational movement of the nut; and (f) means for counteracting the unwanted flexure comprising: mating, longitudinally extending spline means on the longitudinal flexure member and the annular force-applying member to impart rigidity to the longitudinal flexure members in a direction tangential to the direction of translation of the nut along the shaft.

10. An anti-backlash nut according to claim 9, wherein the spline means includes a projecting longitudinal ridge on each flexure member and a complementary mating longitudinal groove in the annular force-applying member.

11. Anti-backlash nut according to claim 9, wherein the spline means includes a longitudinal groove in each flexure member a complementary mating longitudinal ridge projecting from the annular force applying member.

* * * * *